(12) United States Patent
Xu et al.

(10) Patent No.: US 10,599,278 B2
(45) Date of Patent: Mar. 24, 2020

(54) TOUCH STRUCTURE, ARRAY SUBSTRATE AND DISPLAY DEVICE

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Haifeng Xu, Beijing (CN); Dawei Shi, Beijing (CN); Wentao Wang, Beijing (CN); Lu Yang, Beijing (CN); Jinfeng Wang, Beijing (CN); Xiaowen Si, Beijing (CN); Lei Yao, Beijing (CN); Lei Yan, Beijing (CN); Zifeng Wang, Beijing (CN); Liman Peng, Beijing (CN); Wenxiu Li, Beijing (CN); Lei Wang, Beijing (CN); Yaoda Hou, Beijing (CN); Xingyu Peng, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 169 days.

(21) Appl. No.: 15/566,572

(22) PCT Filed: Apr. 19, 2017

(86) PCT No.: PCT/CN2017/081080
§ 371 (c)(1),
(2) Date: Oct. 13, 2017

(87) PCT Pub. No.: WO2018/036179
PCT Pub. Date: Mar. 1, 2018

(65) Prior Publication Data
US 2018/0292934 A1 Oct. 11, 2018

(30) Foreign Application Priority Data

Aug. 26, 2016 (CN) .......................... 2016 1 0740336

(51) Int. Cl.
*G06F 3/047* (2006.01)
*G06F 3/044* (2006.01)
*G06F 3/041* (2006.01)

(52) U.S. Cl.
CPC .............. *G06F 3/047* (2013.01); *G06F 3/044* (2013.01); *G06F 3/0412* (2013.01); *G06F 3/0416* (2013.01); *G06F 2203/04103* (2013.01)

(58) Field of Classification Search
CPC ........ G06F 3/044; G06F 3/047; G06F 3/0412; G06F 3/0416
(Continued)

(56) References Cited

U.S. PATENT DOCUMENTS 9,081,462 B2 * 7/2015 Xie .................. G06F 3/044
2014/0184559 A1 * 7/2014 Han ................. G06F 3/0412
345/174

(Continued)

FOREIGN PATENT DOCUMENTS

CH 205247353 U 5/2016
CH 106201114 A 12/2016
(Continued)

OTHER PUBLICATIONS

The International Search Report and Written Opinion dated Jun. 29, 2017; PCT/CN2017/081080.

*Primary Examiner* — Calvin C Ma
(74) *Attorney, Agent, or Firm* — Ladas & Parry LLP

(57) ABSTRACT

A touch structure, an array substrate and a display device are provided. The touch structure includes touch electrodes and touch electrode lines including a first touch electrode line and a second touch electrode line connected with different (Continued)

touch electrodes. The first touch electrode line includes a first wire and a second wire which are mutually connected. The first wire is connected with the touch electrode, which is connected with the first touch electrode line, via a first through hole running through the insulation layer. The second wire is connected with the touch electrode, which is connected with the first touch electrode line, via a second through hole running through the insulation layer. At least a part of the second touch electrode line is between the second through hole and the first through hole in an arrangement direction of the touch electrode lines.

20 Claims, 4 Drawing Sheets

(58) Field of Classification Search
USPC .................................................. 345/173, 174
See application file for complete search history.

(56) References Cited

U.S. PATENT DOCUMENTS

| 2015/0169109 | A1* | 6/2015 | Park | G06F 3/044 |
| | | | | 345/174 |
| 2015/0177882 | A1* | 6/2015 | Kim | G06F 3/044 |
| | | | | 345/174 |
| 2016/0004353 | A1* | 1/2016 | Park | G06F 3/044 |
| | | | | 345/174 |
| 2017/0010737 | A1 | 1/2017 | Liu et al. | |
| 2017/0068353 | A1 | 3/2017 | Xie et al. | |

FOREIGN PATENT DOCUMENTS

| CN | 103902120 A | 7/2014 |
| CN | 104951162 A | 9/2015 |
| CN | 105094493 A | 11/2015 |
| KR | 1020130060450 A | 6/2013 |

* cited by examiner

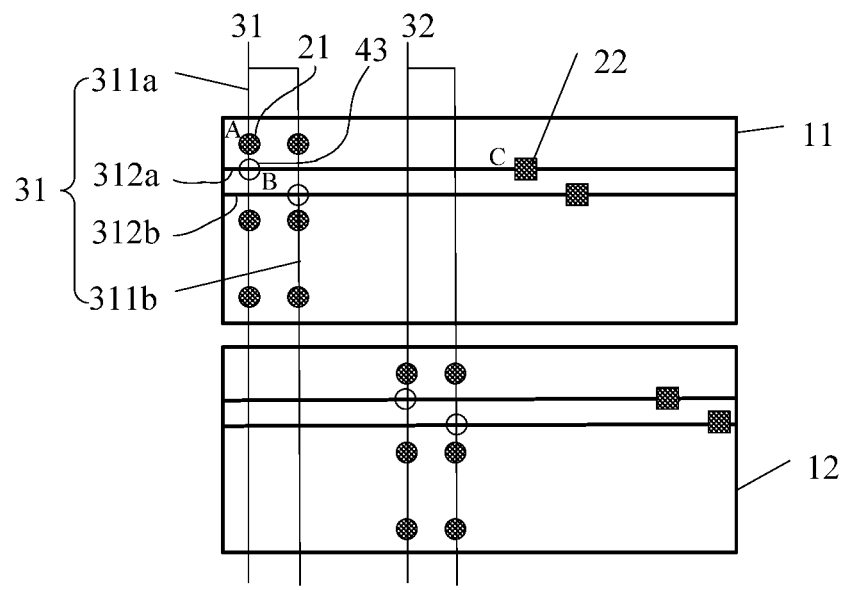
FIG.3b
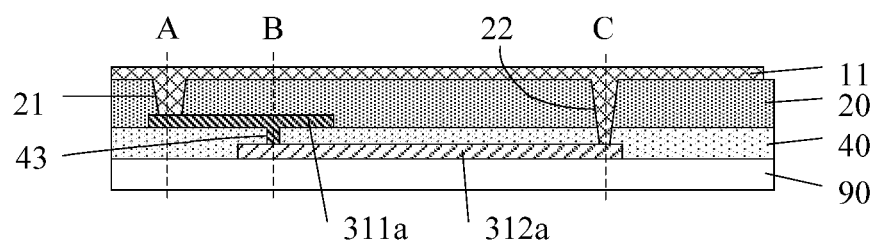
FIG.3c(1)
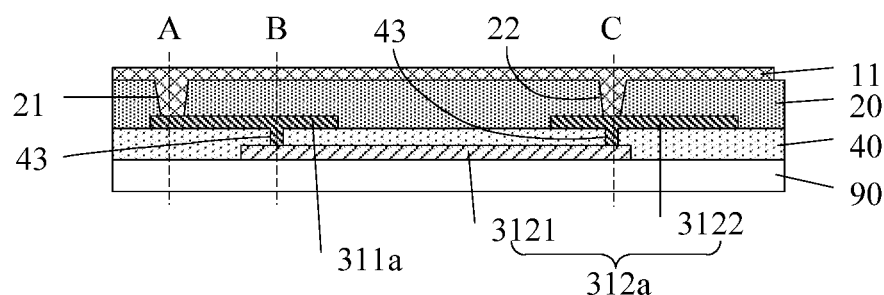
FIG.3c(2)

TOUCH STRUCTURE, ARRAY SUBSTRATE AND DISPLAY DEVICE

TECHNICAL FIELD

Embodiments of the present disclosure relate to a touch structure, an array substrate and a display device.

BACKGROUND

With the rapid development of display technology, touch devices have gradually spread over people's lives. It is a common design to form a touch display device by combining a touch structure for achieving a touch function and a display panel for achieving a display function.

For instance, the display panel includes an array substrate and an opposite substrate which are arranged opposite to each other. For instance, structures such as a pixel array, a thin-film transistor (TFT) array, gate lines and data lines may be on the array substrate. Taking an array substrate provided with a common electrode layer as an example, the common electrode layer may be utilized to form a plurality of touch electrodes of a touch structure. In the use process, for instance, the array substrate may be driven by time-sharing driving mode, namely: applying touch signals respectively to the touch electrodes to achieve the touch function in a touch period, and applying common electrode signals respectively to the touch electrodes to achieve the display function in a display period.

SUMMARY

Embodiments of the present disclosure provide a touch structure, an array substrate and a display device, and the embodiments of the present disclosure can optimize the coverage rate of touch electrode lines relative to touch electrodes, so as to improve touch performance.

At least one embodiment of the present disclosure provides a touch structure which includes: an insulation layer; a plurality of touch electrodes spaced from each other and disposed on a side of the insulation layer; and a plurality of touch electrode lines which are sequentially arranged and disposed on a side, away from the touch electrodes, of the insulation layer and includes a first touch electrode line and a second touch electrode line connected with different touch electrodes. The first touch electrode line includes a first wire and a second wire which are mutually connected; the first wire is connected with the touch electrode, which is connected with the first touch electrode line, via at least one first through hole running through the insulation layer; the second wire is connected with the touch electrode, which is connected with the first touch electrode line, via at least one second through hole running through the insulation layer; and at least a part of the second touch electrode line is between the second through hole and the first through hole in an arrangement direction of the touch electrode lines.

At least one embodiment of the present disclosure further provides an array substrate including the above touch structure.

At least one embodiment of the present disclosure further provides a display device including the above array substrate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 2b is a schematic top view of a first touch electrode line, a second touch electrode line and corresponding touch electrodes in FIG. 2a;

FIG. 3b is a schematic top view of a first touch electrode line, a second touch electrode line and corresponding touch electrodes in FIG. 3a;

FIG. 3c(1) is a first schematic sectional view of positions A, B and C in FIG. 3b;

FIG. 3c(2) is a second schematic sectional view of the positions A, B and C in FIG. 3b;

FIG. 4b is a schematic sectional view of I-I and II-II in FIG. 4a.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
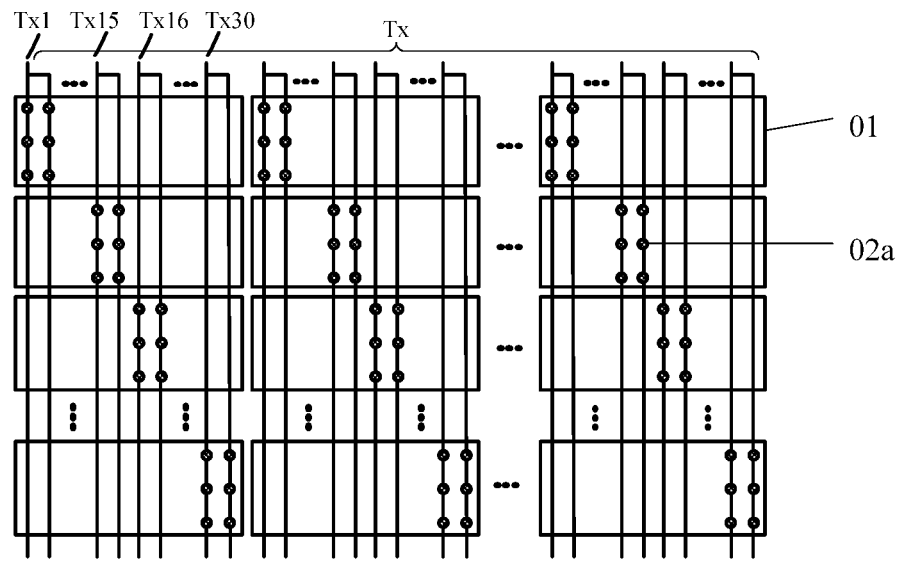
FIG. 1 is a schematic top view of touch electrodes and touch electrode lines in a touch display device.

FIG. 1 is a schematic top view of touch electrodes and touch electrode lines in a touch display device. As illustrated in FIG. 1, a touch display device includes a plurality of touch electrodes 01 arranged in a matrix and a plurality of touch electrode lines Tx spaced from each other; and each touch electrode line Tx is connected with a corresponding touch electrode 01 via connection through holes 02a in an insulation layer (not shown in FIG. 1), so as to lead a signal of the corresponding touch electrode 01 to a touch circuit (not shown in FIG. 1). For instance, each touch electrode line Tx may include a plurality of wires (FIG. 1 takes the case that each touch electrode line Tx includes two wires as an example). In this case, in a situation where one wire is disconnected, the touch electrode line Tx can still lead the signal of the corresponding touch electrode 01 through the remaining wire. For instance, as the touch sensitivity is high at a position close to the connection through hole 02*a* and is low at a position far away from the connection through hole 02*a*, each touch electrode line Tx may be connected with the corresponding touch electrodes 01 via a plurality of connection through holes 02*a*, so that each touch electrode line Tx can have a high sensitivity at a plurality of positions. Thus, the touch performance can be improved.

The inventors of the application noted in the study that: as the wiring of the touch electrode lines Tx in a border area of the touch display device is limited, the distribution of the touch electrode lines Tx in a display area of the touch display device is limited, so each touch electrode line Tx occupies a small part of the touch electrode 01 connected with the touch electrode line. For instance, as illustrated in FIG. 1, each touch electrode 01 corresponds to 30 touch electrode lines (referring to Tx1, Tx15, Tx16 and Tx30) and is connected with one touch electrode line among the 30 touch electrode lines, so the sensing range of each touch electrode line Tx occupies about ⅓₀ of the area of the touch electrode 01 connected with the touch electrode line. As each touch electrode line Tx occupies a small part of the touch electrode 01 connected with the touch electrode line, the coverage rate of the touch electrode line Tx relative to the touch electrode 01 is low, so poor touch can be easily caused. On the other hand, as each touch electrode line Tx occupies a small part of the touch electrode 01 connected with the touch electrode line, the distribution uniformity of the connection through holes 02*a* connecting the touch electrode lines Tx and corresponding touch electrodes 01 can be also poor, so poor touch can be further caused.

Embodiments of the present disclosure provide a touch structure, an array substrate and a display device. The touch structure includes a first touch electrode line and a second touch electrode line which are sequentially arranged and connected with different touch electrodes. The first touch electrode line includes a first wire and a second wire; the first wire and the second wire are connected with the touch electrode, which is connected with the first touch electrode line, via a first through hole and a second through hole running through an insulation layer, respectively; and at least a part of the second touch electrode line is between the first through hole and the second through hole in the arrangement direction of the first touch electrode line and the second touch electrode line. The embodiments of the present disclosure adds the second wire in the first touch electrode line, can optimize the coverage rate of the first touch electrode line relative to the touch electrode connected with the first touch electrode line, and hence can improve the touch performance.

Detailed description will be given below to the embodiments of the present disclosure with reference to the accompanying drawings. The thicknesses, the shapes and the like of structures in the accompanying drawings do not reflect the true scale and are only intended to illustrate the content of the embodiments of the present disclosure.

Figure 2A:
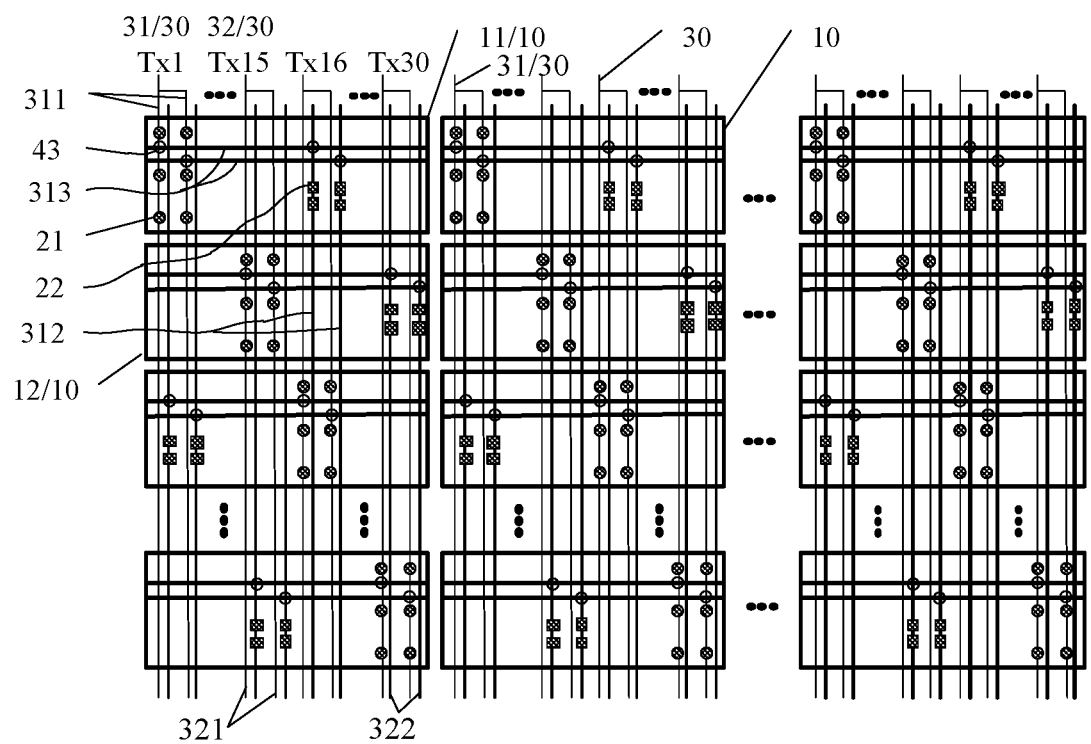
FIG. 2a is a schematic top view of a touch structure provided by an embodiment of the present disclosure.

At least one embodiment of the present disclosure provides a touch structure. As illustrated in FIG. 2*a*, the touch structure includes an insulation layer (not shown in FIG. 2*a*), a plurality of touch electrodes 10 and a plurality of touch electrode lines 30. The plurality of touch electrodes 10 are spaced from each other and arranged on one side of the insulation layer. The plurality of touch electrode lines 30 are sequentially arranged and disposed on one side, away from the touch electrodes 10, of the insulation layer. The plurality of touch electrode lines 30 includes first touch electrode lines 31 and second touch electrode lines 32, each first touch electrode line 31 and a corresponding touch electrode line 32 are connected with different touch electrodes 10. As illustrated in FIG. 2*a*, the first touch electrode line 31 is connected with a touch electrode 11, and the second touch electrode line 32 is connected with a touch electrode 12. For instance, the arrangement direction of the touch electrode 11 and the touch electrode 12 (FIG. 2*a* takes the vertical direction as an example) is different from the arrangement direction of the first touch electrode line 31 and the second touch electrode line 32 (FIG. 2*a* takes the horizontal direction as an example). The first touch electrode line 31 includes first wires 311 and second wires 312 which are connected with each other; each first wire 311 is connected with the touch electrode 11, which is connected with the first touch electrode line 31, via at least one first through hole 21 (as illustrated by a black circle in the figure) running through the insulation layer; each second wire 312 is connected with the touch electrode 11, which is connected with the first touch electrode line 31, via at least one second through hole 22 (as illustrated by a black square in the figure) running through the insulation layer; and at least a part of the second touch electrode line 32 is between the second through hole 22 and the first through hole 21 in the arrangement direction of the touch electrode lines 30 (FIG. 2*a* takes the horizontal direction as an example).

As illustrated in FIG. 2*a*, the touch electrode 11 corresponds to 30 touch electrode lines (referring to Tx1, Tx15, Tx16 and Tx30; the touch electrode 11 may also correspond to touch electrode lines with other number) and is connected with one of the first touch electrode lines 31; as the first touch electrode line 31 includes the first wire 311 and the second wire 312, the coverage area of the first touch electrode line 31 relative to the touch electrode 11 is from the first wire 311 to the second wire 312; and as the second wire 312 is roughly in a middle position of the touch electrode 11 (as illustrated in the figure, 15 touch electrode lines are roughly between the second wire 312 and the first wire 311), the coverage rate of the first touch electrode line 31 relative to the touch electrode 11 (namely the ratio of the sensing range of the first touch electrode line 31 to the area of the touch electrode 11) is about ½. Thus, compared with the case that the touch electrode line Tx occupies about ⅓₀ of the area of the touch electrode 01 connected with the touch electrode line as illustrated in FIG. 1, the embodiment of the present disclosure can effectively optimize the coverage rate of the touch electrode line by addition of the second wire, and hence can improve the touch performance.

For instance, as illustrated in FIG. 2*a*, the touch structure provided by at least one embodiment of the present disclosure may include a plurality of first touch electrode lines 31. The distances between the first wires 311 and the corresponding second wires 312 of the plurality of first touch electrode lines 31 are equal. In this case, the arrangement of the first wires 311 and the second wires 312 can be more regular, so the distribution uniformity of the connection through holes between the touch electrode lines and corresponding touch electrodes can be improved, and hence the touch performance can be further improved.

For instance, as illustrated in FIG. 2*a*, the first touch electrode line 31 may include a plurality of first wires 311

(two first wires 311 are shown in FIG. 2a). Thus, in a situation where one of the first wires 311 is disconnected, the first touch electrode line 31 can also lead a signal of the touch electrode 11 through other first wire 311, so as to reduce the disconnection risk of the first touch electrode line 31.

For instance, in a situation where the first touch electrode line 31 includes the plurality of first wires 311, adjacent end portions of the plurality of first wires 311 are connected with each other.

For instance, each first wire 311 may be connected with the touch electrode 11 via a plurality of first through holes 21 (FIG. 2a takes 3 first through holes as an example), so the first wire 311 has a high sensitivity at a plurality of positions, and hence the touch performance can be improved. Similarly, each second wire 312 may be connected with the touch electrode 11 via a plurality of second through holes 22 (FIG. 2a takes 2 second through holes 22 as an example).

For instance, two ends of the second wire 312 are suspended, so the second wire 312 can lead the signal of the touch electrode 11 to a touch circuit (not shown in FIG. 2a) through the first wire 311 connected with the second wire. Thus, the second wire 312 does not affect the wiring in a border area of a device provided with the touch structure.

For instance, in a situation where the first touch electrode line 31 includes a plurality of second wires 312, the plurality of second wires 312 are parallel to each other.

For instance, in a situation where the first touch electrode line 31 includes a plurality of first wires 311 and a plurality of second wires 312, the distances, each of which is between adjacent first wires 311, of different touch electrode lines 31 are equal; the distances, each of which is between adjacent second wires 312, of different touch electrode lines 31 are equal; and the distances, each of which is between adjacent first wire 311 and second wire 312, of different first touch electrode lines 31 are equal.

It should be noted that the second touch electrode line 32 may adopt the same structure with the first touch electrode line 31 (as illustrated in FIG. 2a). In this case, one part of the second touch electrode line 32 may be, for instance, between the first through hole 21 and the second through hole 22. For instance, the second touch electrode line 32 includes first wires 321 and second wires 322, each first wire 321 and a corresponding second wire 322 are connected with each other. For instance, the first wire 321 and/or the second wire 322 of the second touch electrode line 32 may be between the second through hole 22 and the first through hole 21 at the first touch electrode line 31. For instance, the extension direction of the first wire 311 and the second wire 312 of the first touch electrode line 31 is roughly parallel to the extension direction of the first wire 321 of the second touch electrode line 32; and the first wire 321 of the second touch electrode line 32 is disposed between the first wire 311 and the second wire 312 of the first touch electrode line 31 (with reference to FIG. 2a). In other embodiments, the second wire 322 of the second touch electrode line 32 may also be disposed between the first wire 311 and the second wire 312 of the first touch electrode line 31.

In at least another embodiment, the second touch electrode line 32 may also adopt a different structure with the first touch electrode line 31. For instance, the second touch electrode line adopts the structure of the touch electrode line Tx as illustrated in FIG. 1. In this case, the entire second touch electrode line 32 is disposed between the first through hole 21 and the second through hole 22.

For instance, as illustrated in FIG. 2a, the first touch electrode line 31 further includes a third wire 313 connecting the first wire 311 and a corresponding second wire 312; and the third wire 313 extends along the arrangement direction of the touch electrode lines 30.

For instance, as illustrated in FIG. 2a, the touch structure provided by at least one embodiment of the present disclosure further includes an interlayer insulation layer (not shown in FIG. 2a); the interlayer insulation layer is disposed between a layer provided with the first wire 311 and the second wire 312 and a layer provided with the third wire 313; and each of the first wire 311 and the second wire 312 is connected with the third wire 313 via a third through hole 43 (as illustrated by a hollow circle in the figure) running through the interlayer insulation layer.

Detailed description will be given below to the first touch electrode line 31 including the first wire 311, the second wire 312 and the third wire 313 with reference to FIGS. 2b and 2c, in which FIG. 2b takes the case that the first touch electrode line 31 includes two first wires 311a-311b, two second wires 312a-312b respectively correspondingly connected with the two first wires 311a-311b, and two third wires 313a-313b respectively correspondingly connected with the two first wires 311a-311b as an example.

Figure 2B:
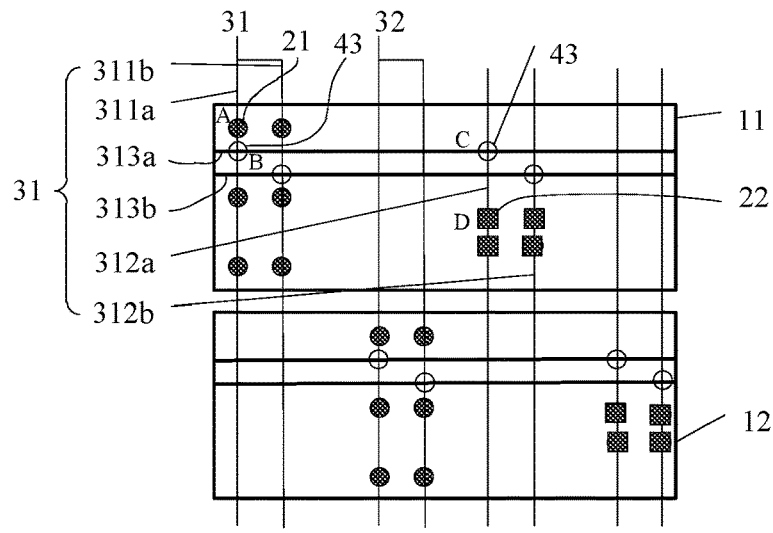
Figure 2C:
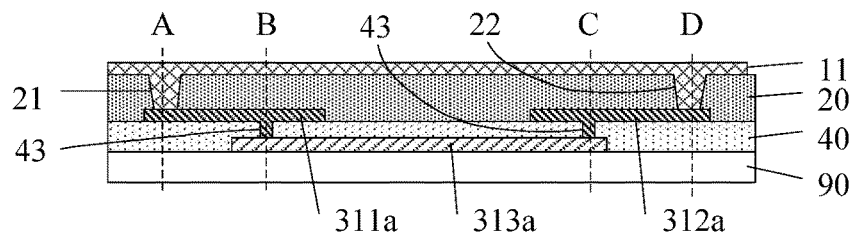
FIG. 2c is a schematic sectional view of positions A, B, C and D in FIG. 2b.

For instance, as illustrated in FIGS. 2b and 2c, the first wire 311a is connected with the touch electrode 11 via a first through hole 21 (referring to an A position) and connected with the third wire 313a via a third through hole 43 (referring to a B position); the third wire 313a is connected with the second wire 312a via a third through hole 43 (referring to a C position); and the second wire 312a is connected with the touch electrode 11 via a second through hole 22 (referring to a D position). Similarly, the first wire 311b is connected with the second wire 312b via the third wire 313b, and both the first wire 311b and the second wire 312b are connected with the touch electrode 11. In FIG. 2b, the structure of the second touch electrode line 32 is similar to the structure of the first touch electrode line 31. Repeated description is omitted herein.

For instance, as illustrated in FIG. 2c, the first wire 311a and the second wire 312a may be arranged in the same layer (namely arranged side by side on the same film), so as to simplify the structure and reduce the manufacturing process.

For instance, as the extension direction of the first wire 311a and the extension direction of the second wire 312a are different from the extension direction of the third wire 313a (as illustrated in FIG. 2b), a layer provided with the first wire 311a and the second wire 312a may be different from a layer provided with the third wire 313a (as illustrated in FIG. 2c), so as to provide convenience for wiring.

For instance, in order to reduce the poor performance of the first through hole 21 and the second through hole 22 due to too thick insulation layer between the first wire 311a/the second wire 312a and the touch electrode 11, as illustrated in FIG. 2c, the layer provided with the first wire 311a and the second wire 312a may be between a layer provided with the third wire 313a and a layer provided with the touch electrode 11. That is to say, in the direction perpendicular to the layer provided with the touch electrode 11, the distance from each of the first wire 311a and the second wire 312a to the touch electrode 11 may be smaller than the distance from the third wire 313a to the touch electrode 11.

It should be noted that description is given in FIG. 2c by taking the case that the third wire 313a, the interlayer insulation layer 40, the first wire 311a and the second wire 312a which are arranged in the same layer, the insulation layer 20 and the touch electrode 11 are sequentially arranged on a base substrate 90 as an example. The embodiments of the present disclosure include but not limited to the structure as illustrated in FIG. 2c.

Figure 3A:
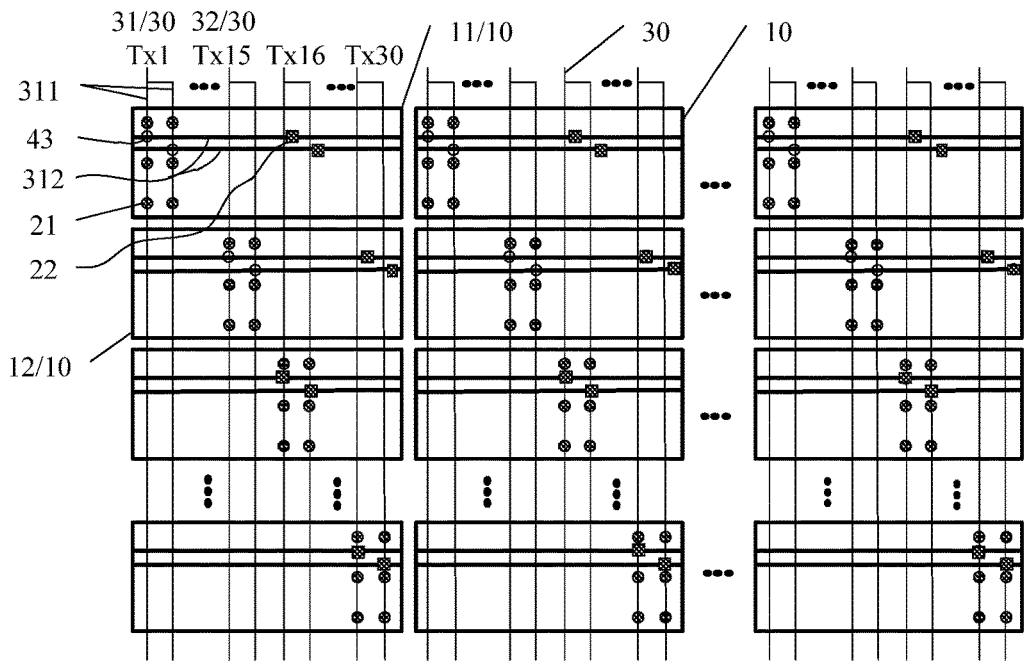
FIG. 3a is a schematic top view of another touch structure provided by an embodiment of the present disclosure.

In the embodiment as illustrated in FIGS. 2a to 2c, the extension directions of the first wire 311 and the second wire 312 in the first touch electrode line 31 are roughly the same. The embodiments of the present disclosure include but not limited to the embodiment as illustrated in FIGS. 2a to 2c. For instance, in at least another embodiment of the present disclosure, as illustrated in FIG. 3a, the extension directions of the first wire 311 and the second wire 312 are intersected with each other.

For instance, as the extension directions of the first wire 311 and the second wire 312 are different, the first wire 311 and at least a part of the second wire 312 may be arranged in different layers, so as to provide convenience for wiring. In this case, an interlayer insulation layer (not shown in FIG. 3a) is disposed between a layer provided with at least the part of the second wire 312 and a layer provided with the first wire 311, and at least the part of the second wire 312 is connected with the first wire 311 via a through hole 43 running through the interlayer insulation layer.

Detailed description will be given below to the first touch electrode line including the first wire and the second wire which are intersected with each other with reference to FIGS. 3b to 3c(2). FIG. 3b takes the case that the first touch electrode line 31 includes two first wires 311a-311b and two second wires 312a-312b respectively correspondingly connected with the two first wires, as an example.

For instance, as illustrated in FIGS. 3b to 3c(2), the first wire 311a is connected with the touch electrode 11 via a first through hole 21 (referring to an A position) and connected with a corresponding second wire 312a via a through hole 43 (referring to a B position), and the second wire 312a is connected with the touch electrode 11 via a second through hole 22 (referring to a C position). The first wire 311b, the second wire 312b and the touch electrode 11 in FIG. 3b are also connected with each other by similar means. Moreover, the structure of the second touch electrode line 32 in FIG. 3b is similar to the structure of the first touch electrode line 31. Repeated description is omitted herein.

For instance, as illustrated in FIG. 3c(1), the first wire 311a and the second wire 312a are arranged in different layers; an insulation layer 20 is disposed between the first wire 311a and the touch electrode 11; an interlayer insulation layer 40 is disposed between the first wire 311a and the second wire 312a; and the first wire 311a is connected with the touch electrode 11 via a second through hole 22 running through the insulation layer 20 and the interlayer insulation layer 40.

For instance, as illustrated in FIG. 3c(2), the first wire 311a and one part of the second wire 312a is arranged in different layers; the second wire 312a includes an extension line 3121 and a connecting piece 3122 which are respectively disposed on both sides of the interlayer insulation layer 40; the extension line 3121 and the connecting piece 3122 are connected with each other via the through hole 43 running through the interlayer insulation layer 40; and the connecting piece 3122 is connected with the touch electrode 11 via the second through hole 22. The embodiment as illustrated in FIG. 3c(2) can reduce the poor performance of the connection through hole between the second wire and the touch electrode due to too thick insulation layer between the second wire and the touch electrode.

For instance, in any one of the above embodiments of the present disclosure, each of the interlayer insulation layer and the insulation layer, which is provided with the touch electrodes and the touch electrode lines respectively on both sides, may be an organic insulation layer, an inorganic insulation layer or a superimposed layer of both; the touch electrode lines may be made of a metallic material such as aluminum, aluminum neodymium alloy, molybdenum, molybdenum niobium alloy, titanium and copper; and the touch electrodes may be made of a transparent conductive material such as indium tin oxide (ITO) and indium zinc oxide (IZO).

The touch structure provided by the embodiments of the present disclosure may be applied to a liquid crystal display (LCD) device, an organic light-emitting diode (OLED) display device or a display device of any other type.

At least one embodiment of the present disclosure further provides an array substrate, which includes the touch structure provided by any one of the above embodiments.

Figure 4A:
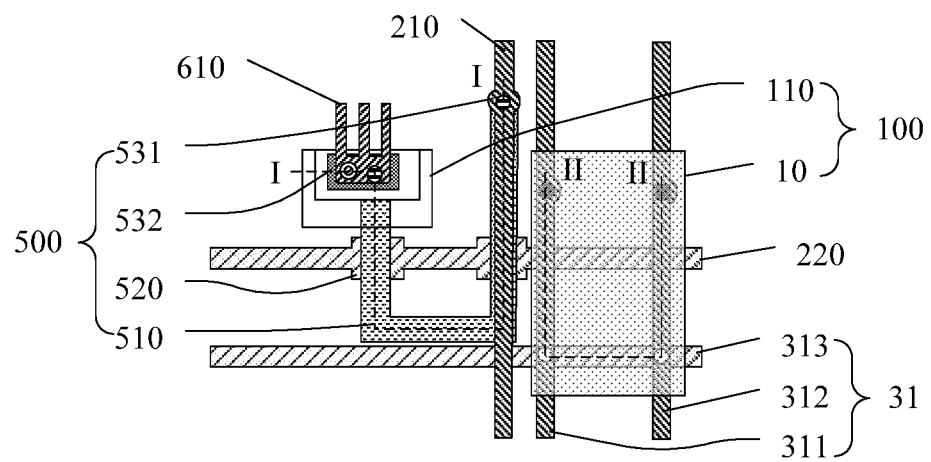
FIG. 4a is a schematic top view of an array substrate provided by an embodiment of the present disclosure.
Figure 4B:
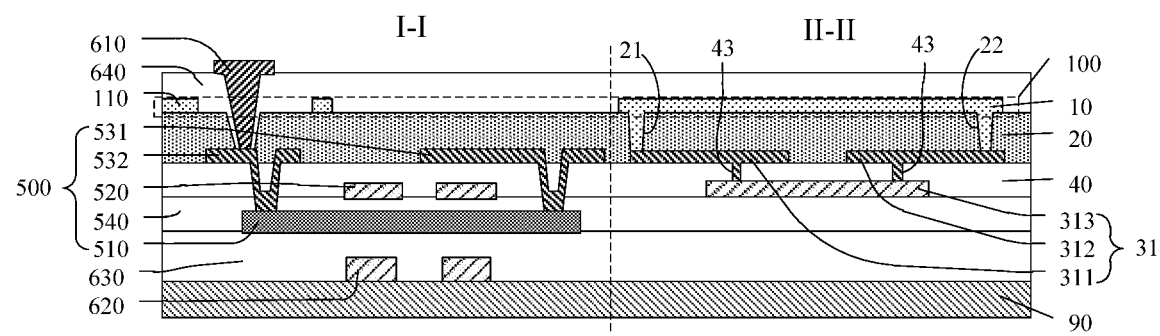

For instance, as illustrated in FIGS. 4a and 4b, the array substrate provided by at least one embodiment of the present disclosure further includes a common electrode layer 100. The touch electrodes 10 are disposed in the common electrode layer 100. As the common electrode layer of the array substrate is utilized to arrange the touch electrodes, the structure of the array substrate can be simplified and the manufacturing process can be reduced.

For instance, the common electrode layer 100 may also be provided with common electrodes 110. For instance, the common electrode layer 100 may be made of a transparent conductive material such as ITO, so as to avoid affecting the aperture opening ratio of the array substrate.

For instance, the array substrate may be an array substrate for an LCD device, an OLED array substrate or a similar array substrate including a common electrode layer.

For instance, the array substrate provided by at least one embodiment of the present disclosure further includes a plurality of first signal lines 210 and a plurality of second signal lines 220 (one first signal line and one second signal line are shown in FIG. 4a). The first signal lines 210 and the second signal lines 220 are intersected with each other and arranged in different layers. For instance, the first signal lines 210 are data lines and the second signal lines 220 are gate lines (as illustrated in FIG. 4a); or the first signal lines are gate lines and the second signal lines 220 are data lines.

For instance, the array substrate further includes a thin film transistor 500. The thin film transistor 500 includes an active layer 510, a gate electrode 520 (two gate electrodes 520 are shown in FIG. 4a), a source electrode 531, a drain electrode 532, and a gate insulation layer 540 between the gate electrode 520 and the active layer 510. The gate electrode 520 is connected with the gate line (as illustrated by 220 in FIG. 4a), for instance, the gate electrode 520 and the gate line are integrally formed; and the source electrode 531 is connected with the data line (as illustrated by 210 in FIG. 4a), for instance, the source electrode 531 and the data line are integrally formed. For instance, the array substrate may further include a light shielding layer 620 and a buffer layer 630 between the light shielding layer 620 and the active layer 510.

Taking the case that the array substrate is the array substrate for the LCD device as an example, as illustrated in FIG. 4a, the array substrate may further include a pixel electrode 610 and a passivation layer 640 between the pixel electrode 610 and the common electrodes 110; and the pixel electrode 610 is connected with the drain electrode 532 of the thin film transistor 500.

For instance, in a situation where the extension directions of the first wire 311 and the second wire 312 as illustrated in FIG. 2a are roughly the same, the first wire 311, the second wire 312 and the first signal lines 210 may have roughly the same extension direction and are arranged in the same layer. Thus, the structure of the array substrate can be simplified and the manufacturing process can be reduced.

In a situation where the first wire 311, the second wire 312 and the first signal lines 210 are arranged in the same layer, for instance, the first signal lines 210 may be data lines, namely the first wire 311 and the second wire 312 may be arranged in the same layer with the data lines. As the data lines in the array substrate are usually thinner than the gate lines, the arrangement mode is favorable for the arrangement of more first wires 311 and more second wires 312, and hence can improve the coverage rate of the touch electrode lines relative to corresponding touch electrodes.

For instance, as illustrated in FIG. 4b, in a situation where the insulation layer 40 between the first touch electrode lines 31 and the touch electrodes 10 includes the organic insulation layer (for instance, the insulation layer is a planarization layer having planarization function) and the data lines (not shown in the figure) are disposed on one side, away from the base substrate 90, of the gate lines (not shown in the figure), as the organic insulation layer is thick, the arrangement of the first wire 311, the second wire 312 and the data lines in the same layer can reduce the poor performance of the first through holes 21 and the second through holes 22.

For instance, in a situation where the first signal lines 210 are data lines and are arranged in the same layer with the source electrode 531 and the drain electrode 532 of the thin film transistor 500, as illustrated in FIG. 4b, the first wire 311, the second wire 312, the source electrode 531 and the drain electrode 532 are arranged in the same layer.

For instance, in a situation where the first touch electrode line 31 as illustrated in FIG. 2a also includes the third wire 313 connecting the first wire 311 and the second wire 312 and the third wire 313 extends along the arrangement direction of the touch electrode lines 30, the third wire 313 and the second signal lines 220 may be arranged in the same layer. For instance, in a situation where the second signal lines 220 are gate lines and are arranged in the same layer with the gate electrode 520 of the thin film transistor 500, as illustrated in FIG. 4b, the third wire 313 and the gate electrode 520 are arranged in the same layer.

For instance, in a situation where the extension directions of the first wire 311 and the second wire 312 as illustrated in FIG. 3a are intersected with each other, the first wire 311 and the second wire 312 may be arranged in different layers. For instance, in this case, the first wire 311 and the first signal lines 210 are arranged in the same layer, and the second wire 312 and the second signal lines 220 are arranged in the same layer. Thus, the structure of the array substrate can be simplified and the manufacturing process can be reduced.

For instance, compared with the array substrate not provided with the first touch electrode lines, the embodiments of the present disclosure can obtain the array substrate as illustrated in FIG. 4b by changing a mask for manufacturing the gate electrode, a mask for manufacturing the gate insulation layer, a mask for manufacturing the source electrode and the drain electrode, and a mask for manufacturing the insulation layer in the manufacturing process of the array substrate. It can be seen that the array substrate provided by the embodiment of the present disclosure has simple structure and manufacturing process.

At least one embodiment of the present disclosure further provides a display device, which includes the array substrate provided by any one of the above embodiments.

For instance, the display device includes a black matrix. In order to prevent the second wires or the third wires added in the touch structure from affecting the aperture opening ratio of the display device, the second wires and the third wires may be shielded by the black matrix.

For instance, the display device provided by the embodiment of the present disclosure includes a display panel. The display panel includes an array substrate and an opposite substrate which are opposite to each other. For instance, the display device may be an in-cell touch display device, namely the touch structure is disposed between the array substrate and the opposite substrate, so as to improve the integration of the display device. In at least another embodiment, the display device may also be non-in-cell type, namely the touch structure is disposed on one side of the opposite substrate away from the array substrate.

The display device provided by the embodiments of the present disclosure may be any product or component with display function such as a liquid crystal display device, an e-paper, an OLED display device, a mobile phone, a tablet PC, a TV, a display, a notebook computer, a digital picture frame and a navigator.

The embodiments of the touch structure, the array substrate and the display device can be referred to each other. Besides, in a case of no conflict, embodiments and features in the embodiments can be combined.

What are described above is related to the illustrative embodiments of the disclosure only and not limitative to the scope of the disclosure; the scopes of the disclosure are defined by the accompanying claims.

This application claims the benefit of Chinese Patent Application No. 201610740336.0, filed on Aug. 26, 2016, which is hereby entirely incorporated by reference as a part of the present application.

What is claimed is:
1. A touch structure, comprising:
an insulation layer;
a plurality of touch electrodes spaced from each other and disposed on a side of the insulation layer;
a plurality of touch electrode lines which are sequentially arranged and disposed on a side, away from the touch electrodes, of the insulation layer and comprises a first touch electrode line and a second touch electrode line connected with different touch electrodes, wherein
the first touch electrode line comprises a first wire and a second wire which are mutually connected; the first wire is connected with the touch electrode, which is connected with the first touch electrode line, via at least one first through hole running through the insulation layer; the second wire is connected with the touch electrode, which is connected with the first touch electrode line, via at least one second through hole running through the insulation layer; and at least a part of the second touch electrode line is between the second through hole and the first through hole in an arrangement direction of the touch electrode lines;
the touch structure further comprises a base substrate;
an orthographic projection of the first touch electrode line on the base substrate overlaps an orthographic protection of the second touch electrode line on the base substrate.
2. The touch structure according to claim 1, wherein the first touch electrode line further comprises a third wire connecting the first wire and the second wire; and the third wire extends along the arrangement direction of the touch electrode lines.

3. The touch structure according to claim 2, wherein the plurality of touch electrode lines comprises a plurality of the first touch electrode lines; and distances, each of which is between the first wire and the second wire, of the plurality of first touch electrode lines are equal.

4. The touch structure according to claim 2, wherein the first wire and the second wire are in a same layer.

5. The touch structure according to claim 4, wherein the layer provided with the first wire and the second wire is between a layer provided with the third wire and a layer provided with the touch electrodes.

6. The touch structure according to claim 5, further comprising an interlayer insulation layer, wherein the interlayer insulation layer is between the layer provided with the first wire and the second wire and the layer provided with the third wire; and each of the first wire and the second wire is connected with the third wire via a third through hole running through the interlayer insulation layer.

7. The touch structure according to claim 1, wherein extension directions of the first wire and the second wire are intersected with each other.

8. The touch structure according to claim 7, wherein the first wire and at least a part of the second wire are in different layers.

9. The touch structure according to claim 8, further comprising:
an interlayer insulation layer between a layer provided with at least the part of the second wire and a layer provided with the first wire.

10. The touch structure according to claim 9, wherein the second wire comprises an extension line and a connecting piece which are respectively on both sides of the interlayer insulation layer; the extension line and the connecting line are connected with each other via a through hole running through the interlayer insulation layer; and the connecting piece is connected with the touch electrode, which is connected with the first touch electrode line, via the second through hole.

11. The touch structure according to claim 3, wherein the first wire and the second wire are in a same layer.

12. An array substrate, comprising the touch structure according to claim 1.

13. The array substrate according to claim 12, further comprising a common electrode layer, wherein the touch electrodes are in the common electrode layer.

14. The array substrate according to claim 12, further comprising a plurality of first signal lines and a plurality of second signal lines, wherein the first signal lines and the second signal lines are intersected with each other and arranged in different layers; and the first wire, the second wire and the first signal lines are arranged in a same layer.

15. The array substrate according to claim 14, wherein
the first touch electrode line further comprises a third wire connecting the first wire and the second wire; the third wire extends along the arrangement direction of the touch electrode lines; and the third wire and the second signal lines are in a same layer.

16. The array substrate according to claim 14, wherein the first signal lines are gate lines and the second signal lines are data lines; or the first signal lines are data lines and the second signal lines are gate lines.

17. A display device, comprising the array substrate according to claim 12.

18. The array substrate according to claim 12, further comprising a plurality of first signal lines and a plurality of second signal lines, wherein the first signal lines and the second signal lines are intersected with each other and arranged in different layers; the first wire and the first signal lines are in a same layer; and the second wire and the second signal lines are in a same layer.

19. A touch structure, comprising:
an insulation layer;
a plurality of touch electrodes spaced from each other and disposed on a side of the insulation layer;
a plurality of touch electrode lines which are sequentially arranged and disposed on a side, away from the touch electrodes, of the insulation layer and comprises a first touch electrode line and a second touch electrode line connected with different touch electrodes, wherein
the first touch electrode line comprises a first wire and a second wire which are mutually connected; the first wire is connected with the touch electrode, which is connected with the first touch electrode line, via at least one first through hole running through the insulation layer; the second wire is connected with the touch electrode, which is connected with the first touch electrode line, via at least one second through hole running through the insulation layer; and at least a part of the second touch electrode line is between the second through hole and the first through hole in an arrangement direction of the touch electrode lines;
the touch structure further comprises a base substrate;
orthographic projections of the first wire and the second wire on the base substrate are between orthographic projections, on the base substrate, of opposite edges of the same touch electrode connecting the first wire and the second wire;
an orthographic projection of the at least one first through hole overlapping the first wire on the base substrate and an orthographic projection of the at least one second through hole overlapping the second wire on the base substrate are within a region where the same touch electrode connecting the first wire and the second wire is located.

20. A touch structure, comprising:
an insulation layer;
a plurality of touch electrodes spaced from each other and disposed on a side of the insulation layer;
a plurality of touch electrode lines which are sequentially arranged and disposed on a side, away from the touch electrodes, of the insulation layer and comprises a first touch electrode line and a second touch electrode line connected with different touch electrodes, wherein
the first touch electrode line comprises a first wire and a second wire which are mutually connected; the first wire is connected with the touch electrode, which is connected with the first touch electrode line, via at least one first through hole running through the insulation layer; the second wire is connected with the touch electrode, which is connected with the first touch electrode line, via at least one second through hole running through the insulation layer; and at least a part of the second touch electrode line is between the second through hole and the first through hole in an arrangement direction of the touch electrode lines;
two ends of the second wire are both free ends, and the second wire is configured to lead a signal of the touch electrode connected with the first electrode line through the first wire connected with the second wire.

* * * * *